United States Patent [19]

Tsai

[11] Patent Number: 4,983,099
[45] Date of Patent: Jan. 8, 1991

[54] TORQUE-VELOCITY CONTROL FOR VARIABLE DISPLACEMENT HYDRAULIC MOTOR

[75] Inventor: Shan-chin Tsai, Rockford, Ill.

[73] Assignee: Sundstrand Corporation, Rockford, Ill.

[21] Appl. No.: 298,751

[22] Filed: Jan. 19, 1989

[51] Int. Cl.$^5$ .............................................. F04B 1/20
[52] U.S. Cl. ...................................... 417/222; 60/448; 60/911
[58] Field of Search .................. 417/222, 218; 60/448, 60/449, 911

[56] References Cited

U.S. PATENT DOCUMENTS

| | | | |
|---|---|---|---|
| 3,506,896 | 4/1970 | Loos | 318/18 |
| 3,533,236 | 10/1970 | Cottington | 60/39.28 |
| 3,741,474 | 6/1973 | Kawada et al. | 235/150.1 |
| 4,139,987 | 2/1979 | Budzich | 60/445 |
| 4,158,290 | 6/1979 | Cornell | 60/445 |
| 4,475,333 | 10/1984 | Tordenmalm | 60/449 |
| 4,486,693 | 12/1984 | Hamati et al. | 318/561 |
| 4,487,109 | 12/1984 | Burandt et al. | 91/506 |
| 4,627,329 | 12/1986 | Durtschi | 91/506 |
| 4,635,441 | 1/1987 | Ebbing et al. | 60/450 |
| 4,669,058 | 5/1987 | Schneider et al. | 364/148 |
| 4,672,811 | 6/1987 | Yoshida et al. | 60/449 |
| 4,726,187 | 2/1988 | Reinhardt et al. | 91/361 |

FOREIGN PATENT DOCUMENTS

| | | | |
|---|---|---|---|
| 153989 | 9/1984 | Japan | 417/218 |
| 153990 | 9/1984 | Japan | 417/218 |

Primary Examiner—Leonard E. Smith
Attorney, Agent, or Firm—Antonelli, Terry, Stout and Kraus

[57] ABSTRACT

A control for a variable displacement hydraulic motor (12) is disclosed. The control includes an electrically controlled hydraulic servo valve (14) for controlling displacement of the hydraulic motor for varying position of a wobbler (28) in response to a servo valve control signal (92); a velocity transducer (72) coupled to a shaft (30) driven by the motor for producing a velocity signal (66) indicative of the velocity of the shaft; a controller (16) for producing the servo valve control signal, the controller including a first signal summer (70) which produces an output signal equal to a difference between a velocity command (68) and the velocity signal, the output signal being applied to an integrator (104) and to a proportional amplifier (76) to produce a wobble position command (82) which is a sum of outputs from the integrator and the proportional amplifier which is processed by the controller to produce the control signal.

45 Claims, 4 Drawing Sheets

TORQUE-VELOCITY CONTROL FOR VARIABLE DISPLACEMENT HYDRAULIC MOTOR

DESCRIPTION

1. Technical Field

The present invention relates to a torque-velocity controls for variable displacement hydraulic motors.

2. Background Art

Figure 1:
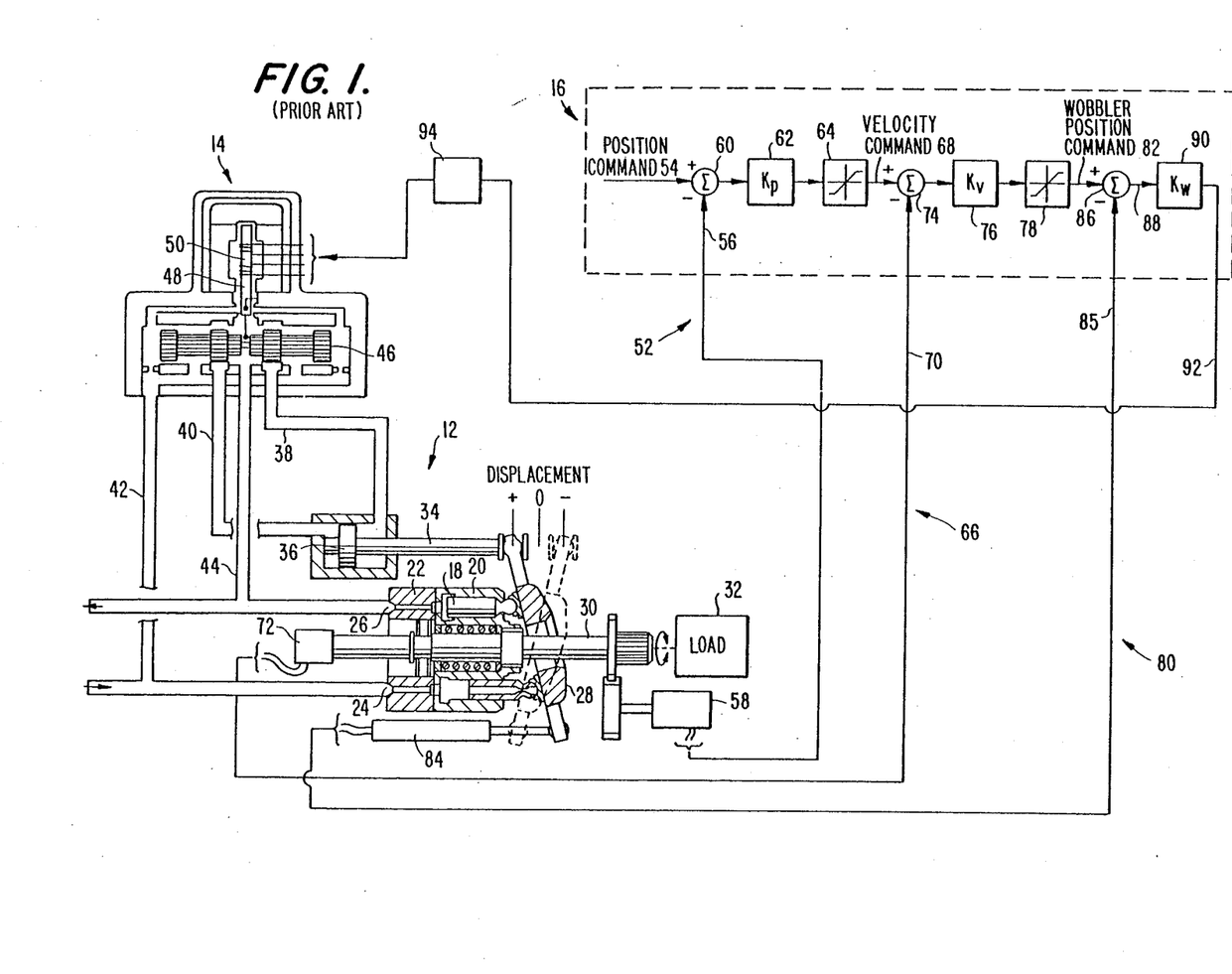
FIG. 1 is a block diagram of a prior art system of which the present invention is an improvement.

U.S. Pat. No. 4,487,109, which is assigned to the assignee of the present invention, discloses a control system for a variable displacement hydraulic motor. FIG. 1 illustrates the system disclosed in the '109 patent including the basic proportional controls for a variable displacement hydraulic motor. The system 10 is comprised of a variable displacement hydraulic motor (VDHM) 12 of conventional construction, and an electro-hydraulic servo valve (EHSV) 14 which functions in a manner to control the displacement of the hydraulic motor 12 in a manner described below and a servo control system 16 containing three proportional controls as described below. As illustrated, the VDHM 12 is an axial piston motor but it should be understood that the present invention is not limited to any form of hydraulic motor. The VDHM 12 has a plurality of pistons 18 which are carried within a series of longitudinal bores with a cylinder block 20. Port plate 22 has a high pressure port 24 for receiving pressurized hydraulic fluid from a source (not illustrated) and an output port 26 which discharges hydraulic fluid for flow back to the source of hydraulic fluid. The flow of hydraulic fluid into the cylinders is controlled by the relative position of the port plate with respect to the rotating cylinder block 20. Wobbler 28 has a variable inclination with respect to drive shaft 30 which applies torque to a load 32. The angle of inclination of the wobbler 28 is varied by the axial position of the piston rod 34. The angular position of the wobbler 28 with respect to the drive shaft controls the displacement of the VDHM 12 with variations in displacement being produced by control of the axial position of piston rod 34.

The EHSV 14 is hydraulically coupled to piston 36 by means of hydraulic lines 38 and 40. Pressurized hydraulic fluid is applied to the EHSV 14 by hydraulic line 42 and is returned to the source of pressurized hydraulic fluid by hydraulic line 44. The EHSV 14 contains a movable valve 46 which is controlled by a servo valve control signal outputted from the servo controller 16. The servo valve control signal causes armature 48 to pivot about pivot point 50.

The servo controller 16 has three separate control loops which each contain a proportional control of conventional construction. The first loop 52 is responsive to a position command 54 and a feedback signal 56 which is derived from a conventional position sensor 58 which is mechanically coupled to the drive shaft to detect its position. Summer 60 takes the difference between the position command and the feedback signal 56 produced by the position sensor 58. A suitable operational amplifier 62 having an amplification characteristic Kp amplifies the output signal from the position sensor. The amplification characteristic Kp is a function of the system in which the VDHM 12 is utilized including the load 32 being driven. The output from the operational amplifier 62 is applied to a suitable limiter 64 to prevent overdriving of the output velocity command 68 produced by the limiter. The second loop 66 is a velocity control loop which is responsive to an input velocity command 68 and a feedback velocity signal 70. The velocity signal 70 is produced by a velocity transducer 72. Summer 74 produces an output signal which is equal to the difference between the input velocity command 68 and the feedback velocity signal 70. Operational amplifier 76 amplifies the output signal from summer 74. The gain of the operational amplifier 76 is a function of the VDHM 12 including the load 32 being driven. The output signal from the operational amplifier 76 is applied to a limiter 78 to prevent overdriving. The third loop 80 is responsive to an input wobbler position command 82 and a feedback signal 86 produced by wobbler position sensor 84. Summer 86 produces an output signal 88 which is equal to the difference between the wobbler position command 82 and the feedback signal from the wobbler position sensor 84. The output signal 88 is amplified by operational amplifier 90 having a gain which is a function of the VDHM and the load 32 being driven to produce the servo valve control signal. The servo valve control signal 92 is amplified by current driver 94.

Variable displacement hydraulic motors have been used in applications involving primary and secondary flight control systems. As performance demands on aircraft actuation systems increase, the resulting hydraulic flow requirements increase dramatically. In a variable displacement hydraulic motor actuation system in aircraft applications, the motor displacement is varied as the load varies to match the power produced by the actuator to that demanded by the load. The aforementioned electro-hydraulic servo valve 14 is used to control the load by varying the motor displacement since the actuator only uses the flow needed to meet the load demand. An actuation system powered by a variable displacement hydraulic motor will operate at high efficiency for all load conditions with the concomitant advantage that the hydraulic flow requirements can be significantly reduced. In actuation systems utilized for airframes which are powered by variable displacement hydraulic motors velocity and torque control are provided by the aforementioned first loop 52 and the second loop 66.

The maximum torque-velocity capacity of a variable displacement hydraulic motor is not fully utilizable when the gain of the operational amplifier 76 in the velocity loop 66 is set at a stable level.

Figure 2:
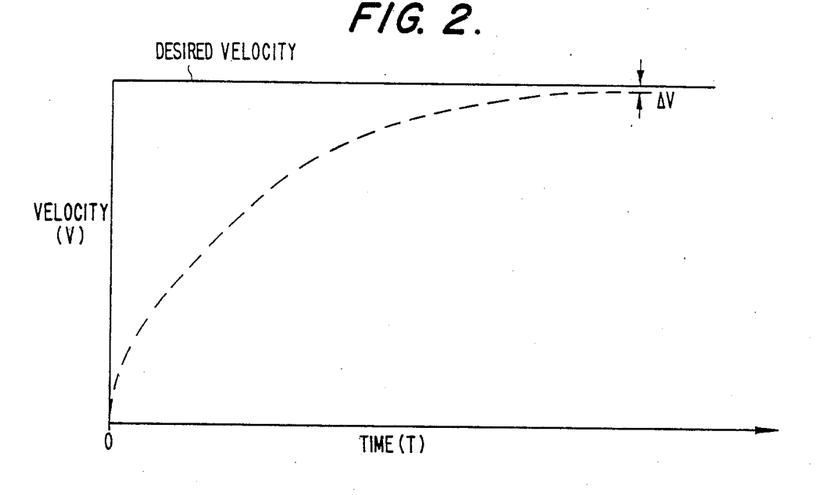
FIG. 2 illustrates the velocity response of the proportional control in the velocity loop of the system of FIG. 1.

FIG. 2 illustrates a response characteristic of the velocity control loop 66 in accelerating up to a desired velocity as indicated by the line identified by "desired velocity" as a function of time. As indicated in FIG. 2, the actual velocity characteristic as identified by the dotted line never actually reaches the "desired velocity" with a steady-state error condition indicated by "$\Delta V$" being the final state which is reached. Any attempt to boost the gain of the proportional controller 76 can lead to instability which will cause overshoot such as ringing and therefore result in an unacceptable error condition. Therefore, the prior art system of FIG. 1, while providing satisfactory overall control suffers from the disadvantage of not being able to achieve full velocity performance as a consequence of the use of proportional control 76.

Figure 3:
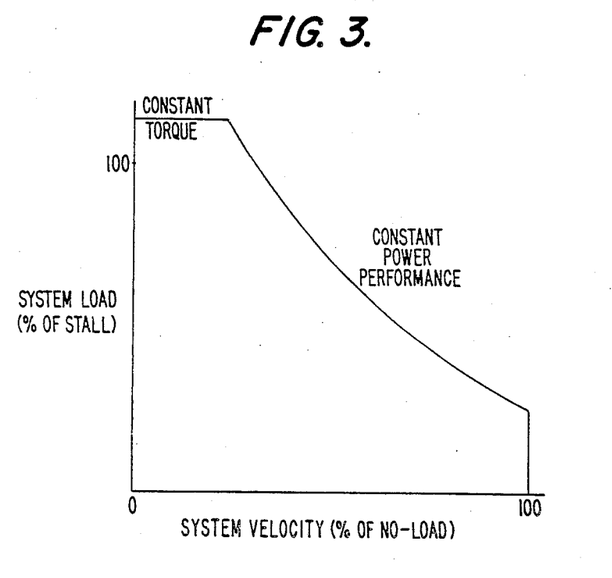
FIG. 3 illustrates a desired type of load torque characteristic which is not achievable with the system of FIG. 1 as a consequence of the error in the velocity loop.

FIG. 3 illustrates a velocity load characteristic which is of particular utility in variable velocity hydraulic motor powered aircraft flight actuation systems. A response of the type illustrated in FIG. 3 is not achievable with the system of FIG. 1 because of the inability of the servo controller 16 to produce a complete velocity response as a consequence of the velocity error "ΔV" always being present in the velocity control loop.

DISCLOSURE OF INVENTION

The present invention provides an improved control for a variable displacement hydraulic motor which achieves any desired torque-velocity performance within the maximum capacity of the variable displacement hydraulic motor. With the invention, the velocity control loop is modified from the prior art to include an integrator. The integrator permits the velocity control loop response characteristic to achieve any desired velocity as a consequence of the integral controller not producing the error "ΔV" which is the characteristic of a velocity control loop containing a proportional control. Since the torque generated by the variable displacement hydraulic motor is proportional to the displacement of the motor which, in turn, is a function of the wobbler position, any desired torque-velocity performance limit can be converted to a wobbler position command-velocity relationship. This relationship is incorporated into the velocity loop as a variable wobbler position limiter such that the limiting value of the limiter varies with the velocity according to the desired wobbler position-velocity relationship. Additionally, the integral controller is included in the velocity control loop with a proportional controller. The integral controller has two advantages which are that a desired torque-velocity relationship may be followed under an opposing load condition and further prevents the variable displacement hydraulic motor from overspeeding in the presence of an aiding load Furthermore, the integral controller has the advantage that it achieves good system stiffness. To prevent overspeeding of the system, the integral controller is stopped by setting the integrator input equal to zero when the output of the velocity control loop reaches the desired limiting value achieved by the aforementioned position limiter. To increase the velocity of response, a derivative control or lead compensation may be added to the system control. Additionally, lead compensation may be added to the wobbler position feedback signal to increase bandwidth.

A control for a variable displacement hydraulic motor in accordance with the invention includes an electrically controlled hydraulic servo valve for controlling the displacement of the hydraulic motor by varying position of a wobbler in response to a servo valve control signal; a velocity transducer coupled to a shaft driven by the motor for producing a velocity signal indicative of the velocity of the shaft; a controller for producing the servo valve control signal, the controller including a first signal summer which produces an output signal equal to a difference between a velocity command and the velocity signal, the output signal being applied to an integrator and to a proportional amplifier and applied to a second summer to produce a wobble position command which is a sum of outputs from the integrator and proportional amplifier which is processed by the controller to produce the control signal. A limiter is coupled to the output of the second summer for limiting the wobble position command to a limit which is a function of the velocity signal and producing the wobble position command on the output of the limiter. A switch is disposed between the first signal summer and the integrator which has a first conductive state coupling the output of the first signal summer to the integrator and a second non-conductive state which isolates the output of the first signal summer from the integrator, the states being controlled by an integrator control signal; and the limiter producing the integrator control signal with the integrator control signal causing the first state when the output of the limiter output has not reached the limit of the limiter and causing the second state when the limiter output reaches the limit of the limiter. A lookup table is provided for varying the limit as a function of the velocity signal which produces a limit on an output in response to the velocity signal. The lookup table produces limits on the output in accordance with a predetermined characteristic of the motor displacement varying as a function of the velocity signal. The bandwidth of the wobbler position command is increased to improve wobbler response velocity. The response characteristic for increasing the bandwidth of the wobbler position command is equal to $$\frac{\tau_1 S + 1}{\tau_2 S + 1}$$

wherein $\tau_1$ and $\tau_2$ are time constants, $\tau_1 > \tau_2$ and s is the La place variable. A lead compensator, is used in the wobbler position control loop to increase the bandwidth of the wobbler position control, and hence its velocity of response.

A control for a variable displacement hydraulic motor in accordance with the invention includes an electrically controlled hydraulic servo valve for controlling displacement of the hydraulic motor by varying position of a wobbler in response to a servo valve control signal; a velocity transducer coupled to a shaft driven by the motor for producing a velocity signal indicative of the velocity of the shaft; a controller for producing the servo valve control signal, the controller including a first signal summer which produces an output signal equal to a difference between a velocity command and the velocity signal, the output signal being applied to an integrator, an amplifier responsive to the velocity signal for providing a signal proportional to the velocity signal, a second summer which produces a wobbler position command equal to a difference between an output signal from the integrator and the signal proportional to the velocity signal which is processed by the controller to produce the control signal. A limiter is coupled to the output of the second summer for limiting the wobbler position command to a limit which is a function of the velocity signal and producing the wobbler position command on an output of the limiter. A switch is disposed between the first signal summer and the integrator which has a first conductive state coupling the output of the first signal summer to the integrator and a second non-conductive state which isolates the output of the first signal summer from the integrator, the states being controlled by an integrator control signal; and the limiter producing the integrator control signal with the integrator control signal causing the first state when the output of the limiter output has not reached the limit of the limiter and causing the second state when the limiter output reaches the limit of the limiter. The limit is varied as a function of the velocity signal by a lookup table which produces a limit on an output in response to the velocity signal, the lookup table producing limits on the output in accordance with a predetermined characteristic of motor load varying as a function of the velocity signal. A modified wobbler position signal is provided in response to a wobbler position feedback signal having an increased bandwidth to increase a rate of variation of the wobbler position signal; and a third summer provides a difference between the wobbler position command and the modified wobbler position feedback signal which is processed by the controller to produce the control signal. The modified wobbler position feedback signal has a response characteristic of $$\frac{\tau_1 S + 1}{\tau_2 S + 2}$$

wherein $\tau 1$ and $\tau 2$ are time constants and $\tau 1 > \tau 2$ and s is the La place variable.

In a control for a variable displacement hydraulic motor having an electrically controlled hydraulic servo valve for controlling the displacement of the hydraulic motor by varying position of a wobbler in response to a servo valve control signal, a velocity transducer coupled to a shaft driven by the motor for producing a velocity signal indicative of the velocity of the shaft; and a controller for producing the servo valve control signal, an improvement in accordance with the invention includes a signal summer which produces an output signal equal to a difference between a velocity command and the velocity signal; and an integrator for integrating the output of the signal summer, the integrator producing an integrator output signal which is processed by the controller to produce the servo valve control signal. A limiter is coupled to the output of the summer for limiting the wobbler position command to a limit which is a function of the velocity signal and producing the wobbler position command on the output of the limiter. A switch is disposed between the signal summer and the integrator which has a first conductive state coupling the output of the signal summer to the integrator and a second non-conductive state which isolates the output of the first signal summer from the integrator, the states being controlled by an integrator control signal; and the limiter producing the integrator control signal with the integrator control signal having the first state when the output of the limiter output has not reached the limit of the limiter and having the second state when the limiter output reaches the limit of the limiter. The limit is varied as a function of the velocity signal by a lookup table which produces a limit on an output in response to the velocity signal, the lookup table producing limits on the output in accordance with a predetermined characteristic of the motor load varying as a function of the velocity signal.

BEST MODE FOR CARRYING OUT THE INVENTION

The present invention is an improvement of the variable displacement hydraulic motor disclosed in U.S. Pat. No. 4,487,109 assigned to the assignee of the present invention. The invention improves the velocity control loop present in the aforementioned patent by providing a response characteristic which enables any desired torque-velocity performance characteristic within the maximum capacity of the variable displacement hydraulic motor to be achieved. The velocity control loop of the present invention includes at least an integrator which eliminates the velocity error $\Delta V$ disclosed in FIG. 2 discussed above. Furthermore, the invention dynamically limits the wobbler position command produced by the output of the velocity control loop to a limit which is a function of a feedback signal produced by a velocity transducer coupled to a shaft driven by the variable displacement hydraulic motor. The aforementioned limiting of the wobbler position command as a function of the velocity of the variable displacement hydraulic motor enables the controller to achieve any torque-velocity performance characteristic within the maximum capacity of the variable displacement hydraulic motor.

Figure 4:
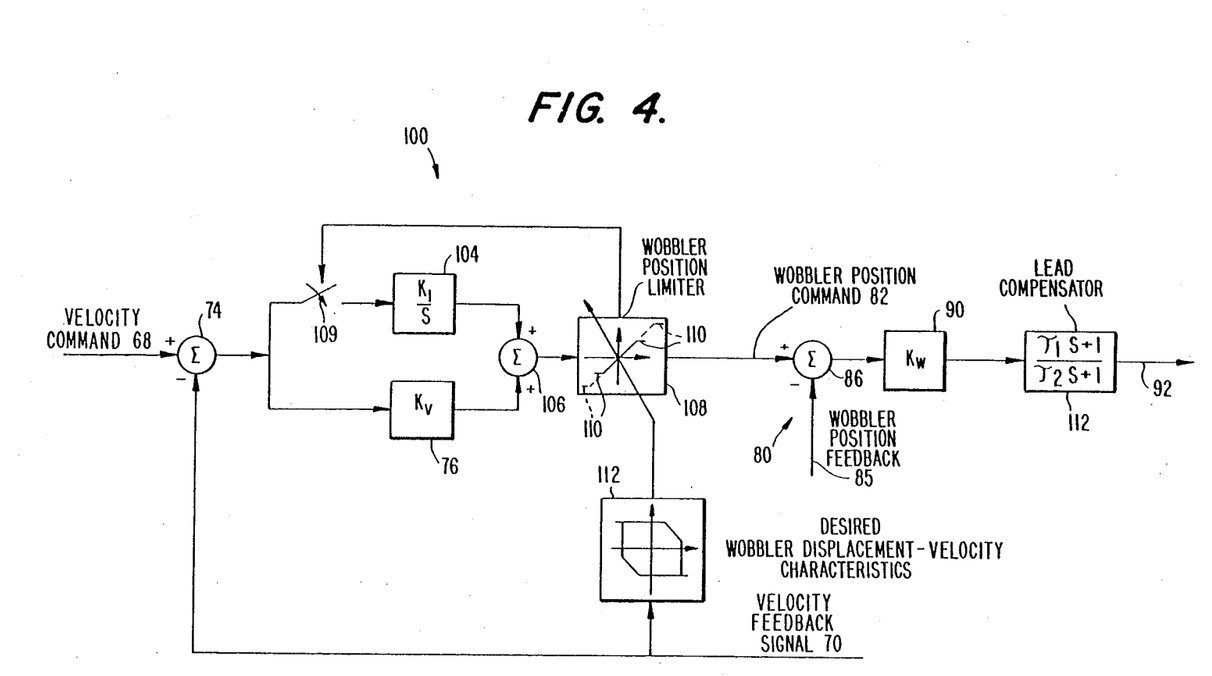
FIG. 4 is a block diagram of a first embodiment of the present invention.

FIG. 4 illustrates a block diagram of an improved velocity control loop 100 in a variable displacement hydraulic motor in accordance with the present invention. Like reference numerals identify like parts in FIGS. 1 and 4. A combination of proportional and integral control is included in the first embodiment 100 to eliminate the velocity error $\Delta V$ illustrated in FIG. 2 discussed above. A proportional control 76, which is implemented in an operational amplifier, has a gain chosen to match the characteristics of the variable displacement hydraulic motor and the load being driven with the gain being chosen to provide rapid response without rendering the system response unstable Integrator 104 is provided to rapidly eliminate the error $\Delta V$ described above with reference to FIG. 2 so as to rapidly provide a velocity response characteristic matching a desired velocity response characteristic. The output of the proportional control 76 and the integrator 104 is summed by summer 106. The output of summer 106 is applied to a wobbler position limiter 108 which has limits 110 which vary as a function of the velocity feedback signal 70. The switch 109 is disposed between the summer 74 and the integrator 104. The switch 109 has a first conductive state coupling the summer 74 to the integrator and a second non-conductive state which isolates the output of the summer 74 from the integrator with the states being controlled by an integrator control signal. The limiter 108 produces the integrator control signal with the integrator control signal causing the first state when the output of the limiter has not reached the limit of the limiter and causing the second state when the limiter output reaches the limit of the limiter. The variable limits 110 are applied to the wobbler position limiter 108 by a lookup table 112. The lookup table 112 is responsive to the feedback velocity signal as an independent variable and outputs as a dependent variable the limits 110 which are a maximum wobbler displacement for the particular velocity of the variable displacement hydraulic motor being fed back to the summer 74. The lookup table 112 converts the analog velocity signal 70 into a digital value which is used to lookup an address in a memory contained in the lookup table to output a limit in accordance with the velocity signal as an independent variable. The output signal from the wobbler position limiter 108 is applied to summer 86 in accordance with the prior art discussed above with reference to FIG. 1. Operational amplifier 90 provides a gain $K_W$ in accordance with the prior art. Lead compensation is provided by lead compensator 113 to increase the bandwidth of the servo valve control signal to permit the gain of the proportional control 76 and integrator 104 to be increased. The lead compensator 173 may be implemented in accordance with known prior art techniques. The output servo valve control signal is applied to a suitable current driver 94 in accordance with the prior art discussed above with reference to FIG. 1. The embodiment 100 of the invention provides an overall torque-velocity performance characteristic which is capable of matching the maximum capacity of a variable displacement hydraulic motor. This matching of the maximum capacity of the variable displacement hydraulic motor is a consequence of the improved velocity response of the velocity control loop of the variable displacement hydraulic motor.

Figure 5:
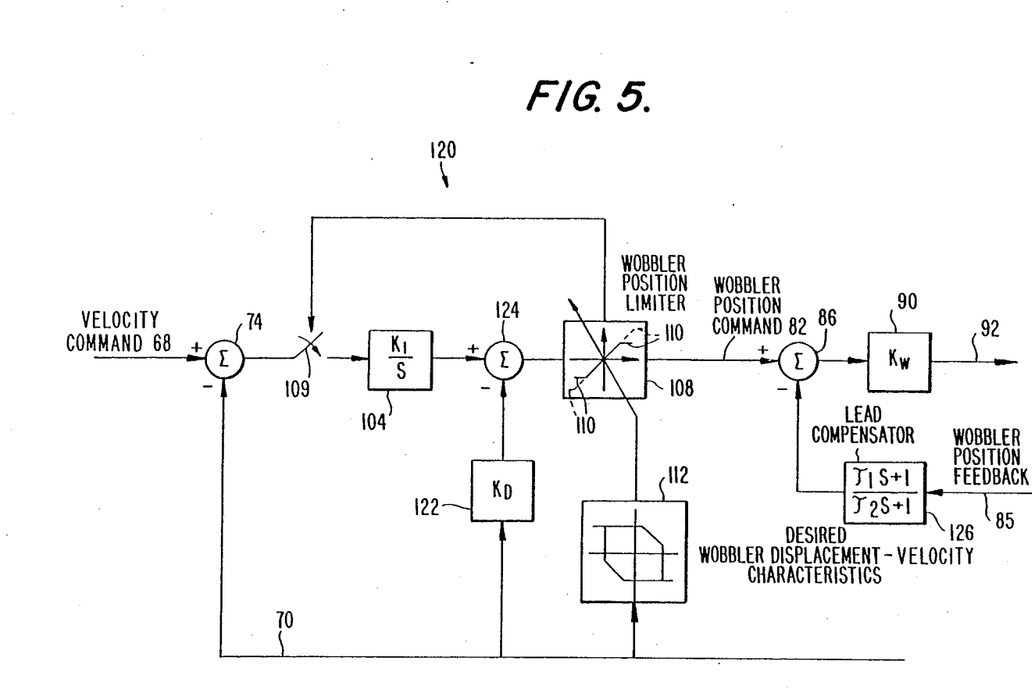
FIG. 5 is a block diagram of a second embodiment of the present invention.

FIG. 5 illustrates a second embodiment 120 of the present invention. Like reference numerals identify like parts in FIGS. 1, 4 and 5. Identical parts in FIGS. 4 and 5 will not be discussed herein with only the differences between the embodiments illustrated in FIGS. 4 and 5 being discussed herein. A proportional control 122 applies a signal to summer 124 which produces an output signal equal to the difference between the output from the integrator 104 and the proportional control 122. The providing of a proportional control signal as a difference signal to a summer whose other input is the output of integrator 104 reduces overshoot present in the proportional and integral controls 76 and 104 discussed above in FIG. 4. The effect of the output signal from the proportional control 122 being subtracted from the output of the integrator 104 causes the output from the summer 124 to have the characteristics of an integral plus differential control. The gain $K_D$ of the proportional control 122 is chosen to match the desired response characteristic of the variable displacement hydraulic motor and load being driven. A lead compensator 126 increases the bandwidth of the wobbler position feedback signal 85 and improves the transient response of the servo valve control signal 92 to permit an increase in the gain $K_W$ of the proportional control 90.

While the present invention has been described in terms of its preferred embodiments, it should be understood that numerous modifications may be made thereto without departing from the spirit and scope of the present invention. It is intended that all such modifications fall within the scope of the appended claims.

I claim:

1. A control for a variable displacement hydraulic motor comprising:

an electrically controlled hydraulic servo valve for controlling the displacement of the hydraulic motor by varying position of a wobbler in response to a servo valve control signal;

a velocity transducer, coupled to a shaft driven by the motor, for producing a velocity signal representative of the velocity of the shaft;

a controller for producing the servo valve control signal, the controller including a first signal summer which produces an output signal equal to a difference between a velocity command and the velocity signal, the output signal being applied to an integrator and to a proportional amplifier and applied to a second summer to produce a wobbler position command which is a sum of outputs from the integrator and proportional amplifier which is processed by the controller to produce the control signal; and a limiter which produces a variable limit as a function of the velocity signal, coupled to an output of the second summer, for limiting the wobbler position command to a limit which is a function of the velocity signal.

2. A control for a variable displacement hydraulic motor in accordance with claim 1 wherein:

the limiter produces the wobbler position command on an output of the limiter.

3. A control for a variable displacement hydraulic motor in accordance with claim 2 further comprising:

means, responsive to the wobbler position command, for increasing bandwidth of the wobbler position command to improve wobbler response velocity.

4. A control for a variable displacement hydraulic motor in accordance with claim 3 wherein:

the means, for increasing bandwidth of the wobbler position command has a response characteristic of $$\frac{\tau_1 s + 1}{\tau_2 s + 1}$$

wherein:

$\tau_1$ and $\tau_2$ are time constants, $\tau_1 > \tau_2$ and s is the La Place variable.

5. A control for a variable displacement hydraulic motor in accordance with claim 2 further comprising:

a switch disposed between the first signal summer and the integrator which has a first conductive state coupling the output of the first signal summer to the integrator and a second non-conductive state which isolates the output of the first signal summer from the integrator, the states being controlled by an integrator control signal; and the limiter producing the integrator control signal with the integrator control signal causing the first state when the of the limiter output does not equal the limit of the limiter and causing the second state when the limiter output equals the limit.

6. A control for a variable displacement hydraulic motor in accordance with claim 5 further comprising:

means, responsive to the wobbler position command, for increasing bandwidth of the wobbler position command to improve wobbler response velocity.

7. A control for a variable displacement hydraulic motor in accordance with claim 6 wherein:

the means, for increasing bandwidth of the wobbler position command has a response characteristic of $$\frac{\tau_1 s + 1}{\tau_2 s + 1}$$

wherein:

$\tau_1$ and $\tau_2$ are time constants, $\tau_1 > \tau_2$ and s is the La Place variable.

8. A control for a variable displacement hydraulic motor in accordance with claim 5 further comprising:

means for varying the limit as a function of the velocity signal.

9. A control for a variable displacement hydraulic motor in accordance with claim 8 further comprising:
means, responsive to the wobbler position command, for increasing bandwidth of the wobbler position command to improve wobbler response velocity.

10. A control for a variable displacement hydraulic motor in accordance with claim 9 wherein:
the means, for increasing bandwidth of the wobbler position command has a response characteristic of $$\frac{\tau_1 s + 1}{\tau_2 s + 1}$$

wherein:
$\tau 1$ and $\tau 2$ are time constants, $\tau 1 > \tau 2$ and s is the La Place variable.

11. A control for a variable displacement hydraulic motor in accordance with claim 8 wherein the means for varying the limit comprises:
a lookup table which produces a limit on an output in response to the velocity signal, the lookup table producing limits on the output in accordance with a predetermined characteristic of the motor load varying as a function of the velocity signal.

12. A control for a variable displacement hydraulic motor in accordance with claim 11 further comprising:
means, responsive to the wobbler position command, for increasing bandwidth of the wobbler position command to improve wobbler response velocity.

13. A control for a variable displacement hydraulic motor in accordance with claim 12 wherein:
the means, for increasing bandwidth of the wobbler position command has a response characteristic of $$\frac{\tau_1 s + 1}{\tau_2 s + 1}$$

wherein:
$\tau 1$ and $\tau 2$ are time constants, $\tau 1 > \tau 2$ and s is the La Place variable.

14. A control for a variable displacement hydraulic motor in accordance with claim 1 further comprising:
means, responsive to the wobbler position command, for increasing bandwidth of the wobbler position command to improve wobbler response velocity.

15. A control for a variable displacement hydraulic motor in accordance with claim 14 wherein:
the means, for increasing bandwidth of the wobbler position command has a response characteristic of $$\frac{\tau_1 s + 1}{\tau_2 s + 1}$$

wherein:
$\tau 1$ and $\tau 2$ are time constants, $\tau 1 > \tau 2$ and s is the La Place variable.

16. A control for a variable displacement hydraulic motor comprising:
an electrically controlled hydraulic servo valve for controlling the displacement of the hydraulic motor by varying position of a wobbler in response to a servo valve control signal;
a velocity transducer, coupled to a shaft driven by the motor, for producing a velocity signal indicative of the velocity of the shaft;
a controller for producing the servo valve control signal, the controller including a first signal summer which produces an output signal equal to a difference between a velocity command and the velocity signal, the output signal being applied to an integrator, an amplifier, responsive to the velocity signal for producing a signal proportional to the velocity, a second summer which produces a wobbler position command equal to a difference between an output signal from the integrator and the signal proportional to the velocity signal which is processed by the controller to produce the control signal; and
a limiter which produces a variable limit as a function of the velocity signal, coupled to an output of the second summer, for limiting the wobbler position command to a limit which is a function of the velocity signal.

17. A control for a variable displacement hydraulic motor in accordance with claim 16 wherein:
the limiter produces the wobbler position command on an output of the limiter.

18. A control for a variable displacement hydraulic motor in accordance with claim 17 further comprising:
means, responsive to a wobbler position feedback signal, for providing a modified wobbler position feedback signal having an increased bandwidth to increase a rate of variation of the wobbler position signal; and
a third summer for producing a difference between the wobbler position command and the modified wobbler position feedback signal which is processed by the controller to produce the control signal.

19. A control for a variable displacement hydraulic motor in accordance with claim 18 wherein:
the means for providing a modified wobbler position feedback signal has a response characteristic of $$\frac{\tau_1 s + 1}{\tau_2 s + 1}$$

wherein $\tau 1$ and $\tau 2$ are time constants, $\tau 1 > \tau 2$ and s is the La Place variable.

20. A control for a variable displacement hydraulic motor in accordance with claim 17 comprising:
a switch, disposed between the first signal summer and the integrator which has a conductive state coupling the output of the first signal summer to the integrator and a non-conductive state which isolates the output of the first signal summer from the integrator, the states being controlled by an integrator control signal; and
the limiter producing the integrator control signal with the integrator control signal causing the first state when the output of the limiter does not equal the limit of the limiter and causing the second state when the limiter output equals the limit.

21. A control for a variable displacement hydraulic motor in accordance with claim 20 further comprising:
means, responsive to a wobbler position feedback signal, for providing a modified wobbler position feedback signal having an increased bandwidth to increase a rate of variation of the wobbler position signal; and a third summer for producing a difference between the wobbler position command and the modified wobbler position feedback signal which is processed by the controller to produce the control signal.

22. A control for a variable displacement hydraulic motor in accordance with claim 21 wherein:
the means for providing a modified wobbler position feedback signal has a response characteristic of $$\frac{\tau_1 s + 1}{\tau_2 s + 1}$$

wherein $\tau_1$ and $\tau_2$ are time constants, $\tau_1 > \tau_2$ and s is the La Place variable.

23. A control for a variable displacement hydraulic motor in accordance with claim 20 further comprising: means for varying the limit as a function of the velocity signal.

24. A control for a variable displacement hydraulic motor in accordance with claim 23 further comprising:
means, responsive to a wobbler position feedback signal, for providing a modified wobbler position feedback signal having an increased bandwidth to increase a rate of variation of the wobbler position signal; and
a third summer for producing a difference between the wobbler position command and the modified wobbler position feedback signal which is processed by the controller to produce the control signal.

25. A control for a variable displacement hydraulic motor in accordance with claim 24 wherein:
the means for providing a modified wobbler position feedback signal has a response characteristic of $$\frac{\tau_1 s + 1}{\tau_2 s + 1}$$

wherein $\tau_1$ and $\tau_2$ are time constants, $\tau_1 > \tau_2$ and s is the La Place variable.

26. A control for a variable displacement hydraulic motor in accordance with claim 23 wherein the means for varying the limit comprises:
a lookup table which produces a limit on an output in response to the velocity signal, the lookup table producing limits on the output in accordance with a predetermined characteristic of the motor load varying as a function of the velocity signal.

27. A control for a variable displacement hydraulic motor in accordance with claim 26 further comprising:
means, responsive to a wobbler position feedback signal, for providing a modified wobbler position feedback signal having an increased bandwidth to increase a rate of variation of the wobbler position signal; and
a third summer for producing a difference between the wobbler position command and the modified wobbler position feedback signal which is processed by the controller to produce the control signal.

28. A control for a variable displacement hydraulic motor in accordance with claim 27 wherein:
the means for providing a modified wobbler position feedback signal has a response characteristic of $$\frac{\tau_1 s + 1}{\tau_2 s + 1}$$

wherein $\tau_1$ and $\tau_2$ are time constants, $\tau_1 > \tau_2$ and s is the La Place variable.

29. A control for a variable displacement hydraulic motor in accordance with claim 16 further comprising:
means, responsive to a wobbler position feedback signal, for providing a modified wobbler position feedback signal having an increased bandwidth to increase a rate of variation of the wobbler position signal; and
a third summer for producing a difference between the wobbler position command and the modified wobbler position feedback signal which is processed by the controller to produce the control signal.

30. A control for a variable displacement hydraulic motor in accordance with claim 29 wherein:
the means for providing a modified wobbler position feedback signal has a response characteristic of $$\frac{\tau_1 s + 1}{\tau_2 s + 1}$$

wherein $\tau_1$ and $\tau_2$ are time constants, $\tau_1 > \tau_2$ and s is the La Place variable.

31. In a control for a variable displacement hydraulic motor having an electrically controlled hydraulic servo valve for controlling the displacement of the hydraulic motor by varying position of a wobbler in response to a servo valve control signal, a velocity transducer coupled to a shaft driven by the motor for producing a velocity signal indicative of the velocity of the shaft, and a controller for producing the servo valve control signal, the improvement comprising:
a signal summer which produces an output signal equal to a difference between a velocity command and the velocity signal;
an integrator for integrating the output of the signal summer, the integrator producing an integrator output signal which is processed by the controller to produce the servo valve control signal; and
a limiter which produces a variable limit as a function of the velocity signal, coupled to an output of the second summer, for limiting the wobbler position command to a limit which is a function of the velocity signal.

32. A control in accordance with claim 31 wherein:
the limiter produces the wobbler position command on an output of the limiter.

33. A control in accordance with claim 32 further comprising:
a switch, disposed between the first signal summer and the integrator, which has a conductive state coupling the output of the first signal summer to the integrator and a non-conductive state which isolates the output of the first signal summer from the integrator, the states being controlled by an integrator control signal; and
the limiter producing the integrator control signal with the integrator control signal causing the first state when the output of the limiter does not equal the limit of the limiter and causing the second state when the limiter output equals the limit.

34. A control for a variable displacement hydraulic motor in accordance with claim 33 further comprising:
means for varying the limit as a function of the velocity signal.

35. A control for a variable displacement hydraulic motor in accordance with claim 34 wherein the means for varying the limit comprises:
a lookup table which produces a limit on an output in response to the velocity signal, the lookup table producing limits on the output in accordance with a predetermined characteristic of the motor load varying as a function of the velocity signal.

36. A control for a variable displacement hydraulic motor contained in servo system for positioning a load driven by the motor at a commanded position specified by a position command comprising:
a position control loop containing a first summer producing a velocity command which is a function of a first difference signal equal to a difference between the position command and a position of the load sensed by a position transducer;
a velocity control loop containing a second summer producing a second difference signal which is a function of a difference between the velocity command and a velocity of the motor sensed by a velocity sensor, the second difference signal being applied to an integrator and to a proportional amplifier respectively producing outputs applied to a third summer to produce a signal which is a sum of the second difference signal amplified by the proportional amplifier and integrated by the integrator to produce a wobbler position command; and
a wobbler position control loop containing a valve which controls displacement of the hydraulic motor by varying position of the wobbler and a summer for producing a third difference signal equal to difference between the wobbler position command and a wobbler position sensed by a wobbler position sensor coupled to the valve, the valve being controlled by a valve control signal which is a function of the third difference signal.

37. A control for a variable displacement hydraulic motor in accordance with claim 36 further comprising:
a limiter which produces a variable limit as a function of velocity sensed by the velocity sensor, coupled to an output of the third summer, for limiting the wobbler position command.

38. A control for a variable displacement hydraulic motor in accordance with claim 37 further comprising:
a switch disposed between the second signal summer and the integrator which has a first conductive state coupling the output of the second signal summer to the integrator and a second non-conductive state which isolates the output of the second signal summer from the integrator by an integrator control signal; and
the limiter produces the integrator control signal with the integrator control signal causing the first state when the output of the limiter does not equal the limit of the limiter and causing the second state when the limiter output equals the limit.

39. A control for a variable displacement hydraulic motor in accordance with claim 38 further comprising:
means for varying the limit as a function of the velocity signal.

40. A control for a variable displacement hydraulic motor in accordance with claim 39 wherein the means for varying the limit comprises:
a lookup table which produces a limit on an output in response to the velocity signal, the lookup table producing limits on the output in accordance with a predetermined characteristic of the motor load varying as a function of the velocity signal.

41. A control for a variable displacement hydraulic motor contained in a servo system for positioning a load driven by the motor at a commanded position specified by a position command comprising:
a position control loop containing a first summer producing a velocity command which is a function of a first different signal equal to a difference between the position command and a position of the load sensed by a position transducer;
a velocity control loop containing a second summer producing a second difference signal which is a function of a difference between the velocity command and a velocity of the motor sensed by a velocity sensor, the second difference signal being applied to an integrator which produces an integrated second difference signal, an amplifier, responsive to a signal proportional to the velocity sensed by the velocity transducer for producing an amplified velocity signal, a third summer which produces a wobbler position command equal to a difference between the integrated second difference signal and the amplifier velocity signal to produce a wobbler position command; and
a wobbler position control loop containing a valve which controls displacement of the hydraulic motor by varying position of the wobbler and a summer for producing a third difference signal equal to a difference between the wobbler position command and a wobbler position sensed by a wobbler position sensor coupled to the valve, the valve being controlled by a valve control signal which is a function of the third difference signal.

42. A control for a variable displacement hydraulic motor in accordance with claim 41 further comprising:
a limiter which produces a variable limit as a function of velocity sensed by the velocity sensor, coupled to an output of the third summer, for limiting the wobbler position command.

43. A control for a variable displacement hydraulic motor in accordance with claim 42 further comprising:
a switch disposed between the second signal summer and the integrator which has a first conductive state coupling the output of the second signal summer to the integrator and a second non-conductive state which isolates the output of the second signal summer from the integrator by an integrator control signal; and wherein
the limiter produces the integrator control signal with the integrator control signal causing the first state when the output of the limiter does not equal the limit of the limiter and causing the second state when the limiter output equals the limit.

44. A control for a variable displacement hydraulic motor in accordance with claim 43 further comprising:
means for varying the limit as a function of the velocity signal.

45. A control for a variable displacement hydraulic motor in accordance with claim 44 wherein the means for varying the limit comprises:
a lookup table which produces a limit on an output in response to the velocity signal, the lookup table producing limits on the output in accordance with a predetermined characteristic of the motor load varying as a function of the velocity signal.

* * * * *